United States Patent [19]

Ammer et al.

[11] Patent Number: 5,372,793
[45] Date of Patent: Dec. 13, 1994

[54] PROCESS OF MANUFACTURING A FRICTION RING FOR USE IN A CLUTCH OR BRAKE

[75] Inventors: Karl Ammer, Vorchdorf; Gerhard Hartner, Bad Wimsbach-Neydharting; Rudolf Geissler, Kirchdorf, all of Austria

[73] Assignee: Miba Sintermetall Aktiengesellschaft, Laakirchen, Austria

[21] Appl. No.: 159,809

[22] Filed: Nov. 30, 1993

[30] Foreign Application Priority Data

Dec. 14, 1992 [AT] Austria ................ A2464/92

[51] Int. Cl.⁵ .................................. B05D 3/02
[52] U.S. Cl. .................... 427/226; 192/107 M; 427/386; 427/387
[58] Field of Search .......... 427/226, 228, 229, 375, 427/386, 387, 388.1, 388.2; 192/107 M

[56] References Cited

U.S. PATENT DOCUMENTS 5,143,192  9/1992  Vojacek et al. ............. 192/107 M
5,249,661 10/1993  Kawamura et al. ........... 142/107 M

FOREIGN PATENT DOCUMENTS 385826  5/1988  Austria .
0144464  6/1985  European Pat. Off. .

*Primary Examiner*—Michael Lusignan
*Attorney, Agent, or Firm*—Collard & Roe

[57] ABSTRACT

A process is described for manufacturing a friction ring for use in a clutch or brake. Said friction ring comprises a sintered friction lining that is provided on at least one peripheral surface of a conical or cylindrical carrying ring, which has been formed from a flat sheet metal blank after a coating comprising a sinterable powder mixture has been formed on the flat sheet metal blank. In order to permit a shaping of the sheet metal blank independently of the ductility of the sintered friction lining, it is proposed that the sinterable powder mixture for making the friction lining is mixed with an expellable synthetic resin binder before said mixture is applied to the flat sheet metal blank to form said coating, said coating is set, the sheet metal blank provided with said coating is shaped to form the friction ring when said coating has been set, and the friction lining is subsequently sintered while or after the synthetic resin binder is expelled at least in part.

10 Claims, No Drawings

PROCESS OF MANUFACTURING A FRICTION RING FOR USE IN A CLUTCH OR BRAKE

BACKGROUND OF THE INVENTION

1. Field of the Invention

This invention relates to a process of manufacturing a friction ring for use in a clutch or brake, which friction ring comprises a sintered friction lining that is provided on at least one peripheral surface of a conical or cylindrical carrying ring, which has been formed from a flat sheet metal blank after a coating comprising a sinterable powder mixture has been formed on the flat sheet metal blank.

2. Description of the Prior Art

To permit a simple manufacture of friction rings which are intended for use in clutches or brakes and comprise a friction lining which has been sinterbonded to the carrying ring, it has been disclosed in Austrian Patent Specification 385,826 to blank the carrying ring from flat sheet metal and to provide said carrying ring while it is still flat with a sinterbonded friction lining on at least one of its surfaces which are intended to form the conical or cylindrical peripheral surfaces and subsequently to shape the flat carrying ring to the desired conical or cylindrical shape between the female die and punch of a shaping tool. But the sintered friction lining cannot be shaped together with the sheet metal ring unless the sintered friction lining has a sufficient ductility. This requirement imposes limits as regards the composition which may be selected for the sintered friction lining. For this reason it is usual to provide for that purpose sintered friction lining, which comprise non-ferrous heavy metals, which in contact with transmission oils having a high additive content, e.g., tend to form sulfides, which adversely affect the performance of the friction lining. On the other hand, the ductility requirement precludes a decrease of the non-ferrous heavy metal content of the friction lining in favor of other metals, such as iron.

SUMMARY OF THE INVENTION

It is an object of the invention to avoid the disadvantage outlined hereinbefore and to provide for the manufacture of friction rings a process which is of the kind described first hereinbefore and is improved in that the composition of the sintered friction lining can be selected, independently of its ductility, so as to provide a friction lining which will exhibit the required performance and can be applied in a simple manner to a flat sheet metal blank.

That object is accomplished in accordance with the invention in that the sinterable powder mixture for making the friction lining is mixed with an expelable synthetic resin binder before said mixture is applied to the flat sheet metal blank to form said coating, said coating set, the sheet metal blank provided with said coating is shaped to form the friction ring when said coating has been set, and the friction lining is subsequently sintered while or after the synthetic resin binder is expelled at least in part.

Because an expellable synthetic resin binder is added to the sinterable powder mixture, said synthetic resin binder can be at least partly cured so that the coating on the flat sheet metal blank is sufficiently set for being shaped together with the sheet metal blank to form the friction ring. Because the coating is sintered after the flat sheet metal ring has been shaped to form the carrying ring, the shaping operation will be influenced by the ductility of the synthetic resin bond rather than by the ductility of the sintered friction lining. For this reason the composition of the sintered friction lining can be selected within wide ranges. It is possible to use sintered friction linings made of iron powder as well as sintered friction linings made of brass or bronze. It is merely essential that the bond provided by the synthetic resin before the coated sheet metal blank is shaped can be replaced by a sintered bond after the coated sheet metal blank has been shaped. For that purpose the synthetic resin binder must be expelled from the coating to an adequate degree before the sintering is terminated.

DETAILED DESCRIPTION OF THE PREFERRED EMBODIMENT

It is desired to ensure an adequate strength of the synthetic resin bond and to permit a simple expulsion of the synthetic resin binder. For that purpose the synthetic resin binder must be selected with a view of said requirements. Satisfactory results will generally be produced if the mixture of sinterable metal powder and synthetic resin binder contains a synthetic resin binder consisting of a poly(vinyl-acetate) in an amount of 3 to 30% by weight, preferably of 10 to 20% by weight of said mixture. Alternatively, the synthetic resin binder may consist of a phenolic resin in an amount of 3 to 10% by weight, preferably of 4 to 6% by weight, of the mixture of sinterable powder and synthetic resin binder. In the latter case, satisfactory results regarding the strength of the synthetic resin bond and regarding the expulsion of the binder before the sintering operation will also be produced. It will be understood that other synthetic resin binders may also be used, such as silicon resins or epoxy resins.

Because pores are formed in the friction lining as the synthetic resin binder is expelled therefrom, the particle size of the synthetic resin binder powder which is added to the sinterable powder mixture may be selected to control the porosity of the sintered friction lining.

In the manufacture of a friction ring by the process in accordance with the invention it is possible to provide, e.g., a flat annular sheet metal blank although such an annular blank is not essential because flat metal strips can be curled in the process in accordance with the invention to form conical or cylindrical carrying rings. The flat sheet metal blank may be degreased and optionally roughened by grinding, sandblasting or brushing and a rough primer may be applied to the blank, e.g., by a sintering operation, before the material for the friction lining is applied. Such a rough primer will improve the bond between the friction lining and the sheet metal blank. The sinterable powder mixture to which a synthetic resin binder, such as a polyvinyl acetate, has been added, is applied to the flat sheet metal blank which has been prepared as outlined hereinbefore. The mixture of sinterable powder and synthetic resin binder powder may be strewed or pressed onto the flat sheet metal blank. The friction lining is subsequently cured under conditions regarding temperature, pressure and exposure to ultraviolet radiation which will be determined in dependence on the binder employed and will not result in a sintering of said metal powder mixture. When the workpiece has thus been pretreated, it may be rounded at its edges in order to reduce its notch crack sensitivity before the workpiece is shaped by embossing or deep drawing. That shaping can readily be performed regardless of the composition of the sinterable coating because the ductility of the coating during the shaping operation depends only on the synthetic resin bond. When the flat metal blank has been shaped to form the conical or cylindrical carrying ring, the coating on said carrying ring can be sintered in a conventional sintering process in a reducing atmosphere. By that sintering process the synthetic resin content is expelled from the coating and the porosity of the resulting friction lining is controlled. In order to prevent cracking processes it is possible to burn the synthetic resin binder out of the coating in an oxidizing atmosphere by a treatment at a certain elevated temperature before the sintering.

Any changes in the geometry of the workpiece which may be due to the sintering operation may be eliminated in that the sintered workpiece is subjected to a calibrating operation, in which the friction lining may be formed with grooves. The cylindrical or conical friction rings made by the process in accordance with the invention can be processed further in conventional manner.

We claim:

1. A process of manufacturing a friction ring comprising a carrying ring having inside and outside annular peripheral surfaces and a sintered friction lining on at least one of said surfaces, which process comprises
   applying a metal-resin mixture comprising a sinterable metal powder and an expellable synthetic resin binder to at least one surface of a flat sheet metal blank
   to form a coating thereon,
   causing said coating to set without sintering said sinterable metal powder mixture,
   subsequently shaping said blank with said coating to form said carrying ring,
   sintering said sinterable metal powder in said coating on said formed carrying ring, and
   expelling said synthetic resin binder from said coating on said carrying ring before said sintering is terminated.

2. The process set forth in claim 1 as applied to the manufacture of a friction ring in which said carrying ring has cylindrical inside and outside peripheral surfaces.

3. The process set forth in claim 1 as applied to the manufacture of a friction ring in which said carrying ring has conical inside and outside peripheral surfaces.

4. The process set forth in claim 1, wherein said synthetic resin binder consists of a polyvinyl acetate, which is admixed to said sinterable metal powder mixture in an amount of 3 to 30% by weight of said metal-resin mixture.

5. The process set forth in claim 4, wherein said polyvinyl acetate is admixed to said sinterable metal powder mixture in an amount of 10 to 20% by weight of said metal-resin mixture.

6. The process set forth in claim 1, wherein said synthetic resin binder is expelled from said coating on said carrying ring at least in part before said sintering.

7. The process set forth in claim 6, wherein
   said synthetic resin binder is expelled by oxidation-reduction reactions in an oxidizing atmosphere and the metal powder is sintered in a reducing atmosphere.

8. The process set forth in claim 1, wherein said synthetic resin binder consists of a phenolic resin, which is admixed to said sinterable metal powder mixture in an amount of 3 to 10% by weight of said metal-resin mixture.

9. The process set forth in claim 8, wherein said phenolic resin is admixed to said sinterable metal powder mixture in an amount of 4 to 6% by weight of said metal-resin mixture.

10. The process set forth in claim 1, wherein said synthetic resin binder is selected from the group consisting of polyvinyl acetate, phenolic resins, silicone resins, and epoxy resins.

* * * * *